(12) United States Patent
Lee et al.

(10) Patent No.: US 6,859,602 B2
(45) Date of Patent: Feb. 22, 2005

(54) METHOD FOR FABRICATING PLANAR LIGHT WAVEGUIDE CIRCUITS WITH VERTICAL TAPER STRUCTURE

(75) Inventors: Joo-Hoon Lee, Yongin-shi (KR); Duk-Yong Choi, Anyang-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/600,686

(22) Filed: Jun. 20, 2003

(65) Prior Publication Data

US 2004/0042752 A1 Mar. 4, 2004

(30) Foreign Application Priority Data

Aug. 29, 2002 (KR) ................................. 10-2002-0051359

(51) Int. Cl.[7] ............................ G02B 6/10; H01L 21/00
(52) U.S. Cl. ............................. 385/129; 385/43; 438/31
(58) Field of Search ............................. 385/39, 43, 45, 385/129, 131, 147; 438/31

(56) References Cited

U.S. PATENT DOCUMENTS

| | | | |
|---|---|---|---|
| 5,323,476 A | 6/1994 | Mueller et al. ................ 385/43 |
| 6,697,552 B2 * | 2/2004 | McGreer et al. .............. 385/37 |
| 2002/0191916 A1 * | 12/2002 | Frish et al. ..................... 385/43 |
| 2003/0044118 A1 * | 3/2003 | Zhou et al. ..................... 385/43 |
| 2003/0235933 A1 * | 12/2003 | Rantala et al. ................. 438/31 |
| 2004/0005131 A1 * | 1/2004 | Rantala et al. ................ 385/129 |

FOREIGN PATENT DOCUMENTS

| | | | |
|---|---|---|---|
| JP | 10090537 | 4/1998 | .......... G02B/6/122 |
| WO | WO02-063347 A2 | 8/2002 | |

OTHER PUBLICATIONS

"Very Low Insertion Loss Arrayed–Waveguide Grating with Vertically Tapered Waveguides;" A. Sugita et al., XP000968634; Sep. 2000; pp. 1180–1182.

"A Review on Fabrication Technologies for the Monolithic Integration of Tapers with III–V Semiconductor Devices;" I. Moerman et al.; XP002146284; Dec. 1997; pp. 1308–1320.

* cited by examiner

*Primary Examiner*—John R. Lee
*Assistant Examiner*—Christopher M. Kalivoda
(74) *Attorney, Agent, or Firm*—Cha & Reiter, L.L.C.

(57) ABSTRACT

Disclosed is a method for fabricating planar light waveguide circuits, wherein the circuit has a structure that includes a substrate comprised of a core and under-clad layers, an optical circuit, and a plurality of arrayed waveguides coupled thereon. More specifically, the method includes the steps of layering a hard layer on the core layer for forming a mask pattern of the planar light waveguide circuit; forming the mask pattern on the hard layer; layering a photoresist layer on a branch of the optical circuit and the arrayed waveguides of the mask pattern; forming a vertical taper structure on the photoresist layer using a gray scale mask; and, etching the core layer using the photoresist layer with the vertical taper structure and the mask pattern.

6 Claims, 13 Drawing Sheets

METHOD FOR FABRICATING PLANAR LIGHT WAVEGUIDE CIRCUITS WITH VERTICAL TAPER STRUCTURE

CLAIM OF PRIORITY

This application claims priority to an application entitled "METHOD FOR FABRICATING PLANAR LIGHT WAVEGUIDE CIRCUITS WITH VERTICAL TAPER STRUCTURE," filed in the Korean Intellectual Property Office on Aug. 29, 2002 and assigned Serial No. 02-51359, the contents of which are hereby incorporated by reference.

BACKGROUND OF THE INVENTION

1. Field of the Invention

The present invention generally relates to a method for fabricating planar light waveguide circuits and, more particularly, to a method for fabricating planar light waveguide circuits with a vertical taper structure.

2. Description of the Related Art

In general, a planar light waveguide circuit (PLC) is an essential component of the integrated optical circuit used in a high-speed optical network. Its application extends to an optical distributor, coupler, modulator, interferometry switch, semiconductor laser, and circuit for use in the dense-wavelength-division-multiplexing (DWDD) communication.

Figure 1:
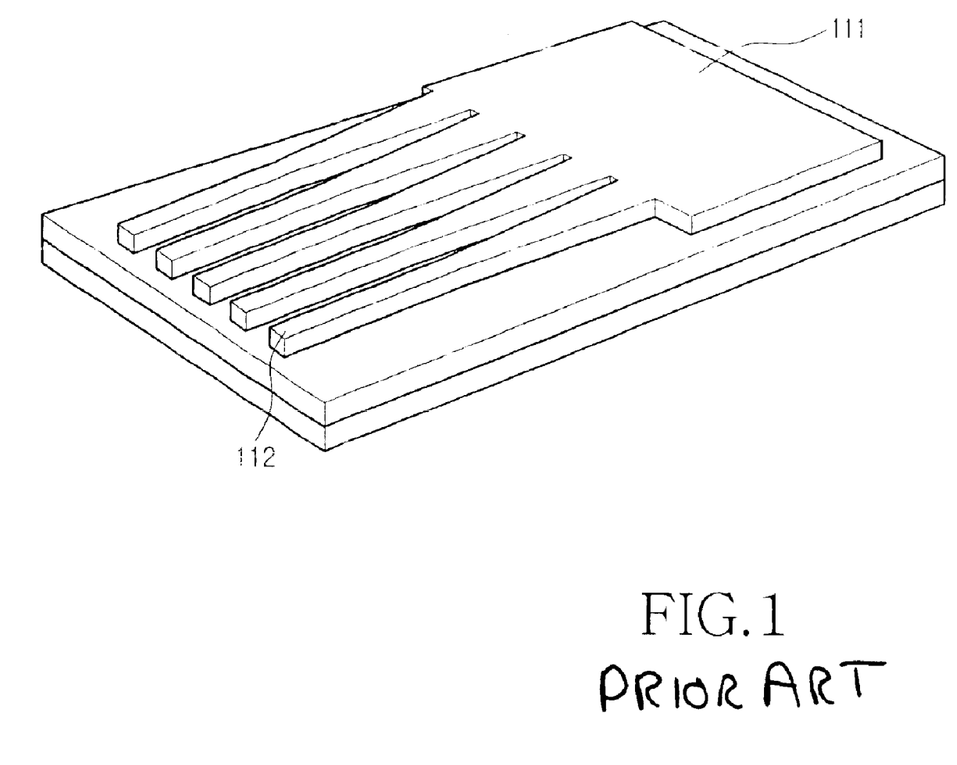
FIG. 1 is a perspective view of a known planar light waveguide.

FIG. 1 is a perspective view of a known planar light waveguide circuit. As shown in the drawing, the planar light waveguide circuit includes a slab 111, an arrayed waveguide 112, and a branch section for making a junction with the arrayed waveguide 112. However, during operation, the mode mismatch of the branch section between the slab 111 and the arrayed waveguide 112 tends to cause optical signal loss. That is, many optical signals are lost primarily because the pluralities of the arrayed waveguides 112 and the slab 111 have different-sized branches. For example, the coupling of the slab 111 of arrayed waveguide gratings and arrayed waveguide 112, or the mode mismatch of the Y-Branch of the optical-power splitter and arrayed waveguide 112 cause cross-talk with other optical signals of different channels, thus losing optical signals in the course.

Figure 2A:
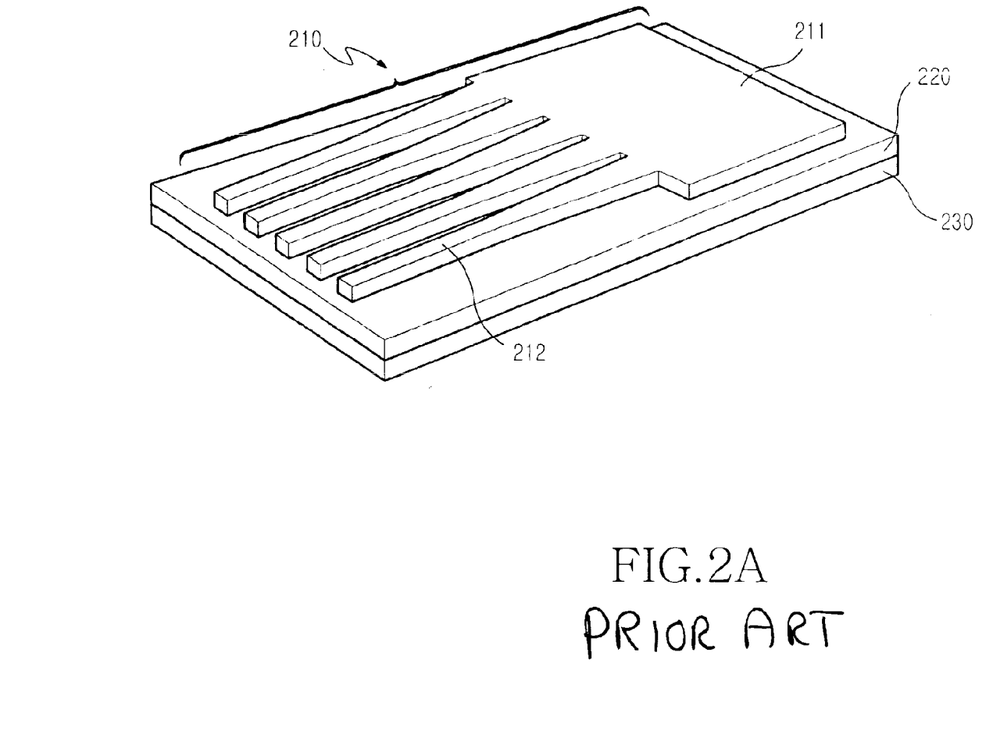
FIG. 2(a) is a perspective view illustrating the mask-pattern-formation procedure for fabricating the known vertical taper structure.
Figure 2B:
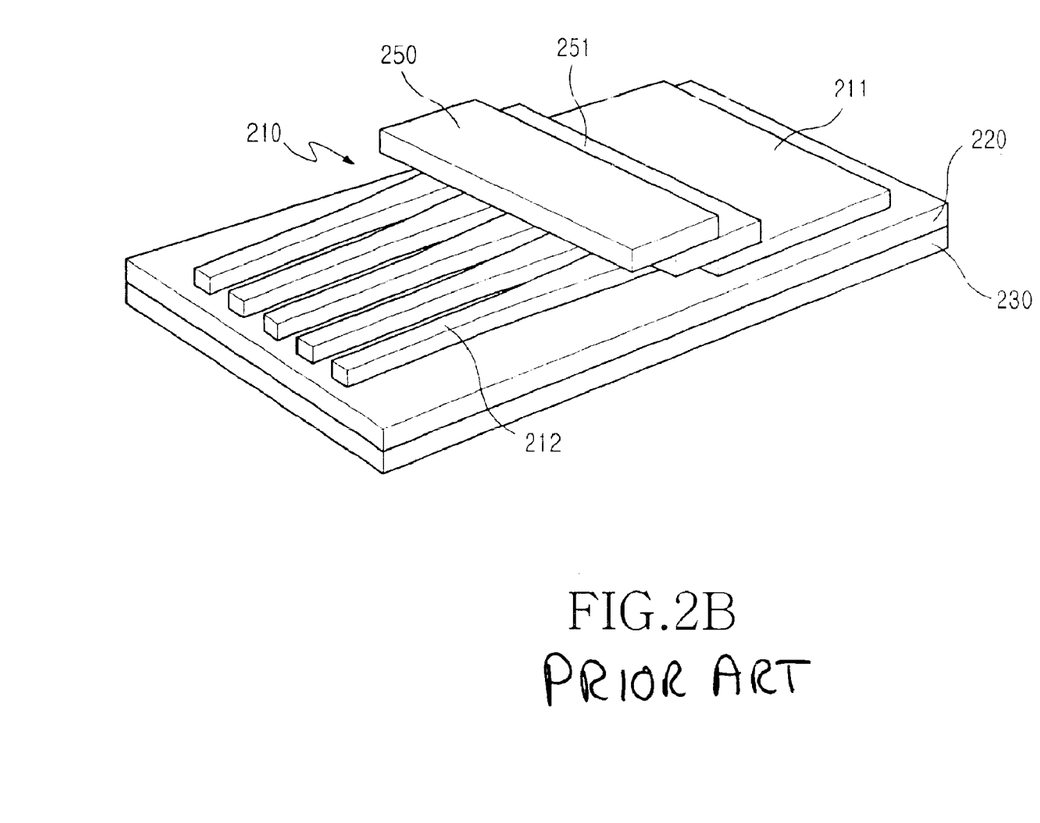
FIG. 2(b) is a perspective view illustrating the installation of a shadow mask at the branch of the planar light waveguide circuit in order to fabricate the known vertical taper structure.
Figure 2C:
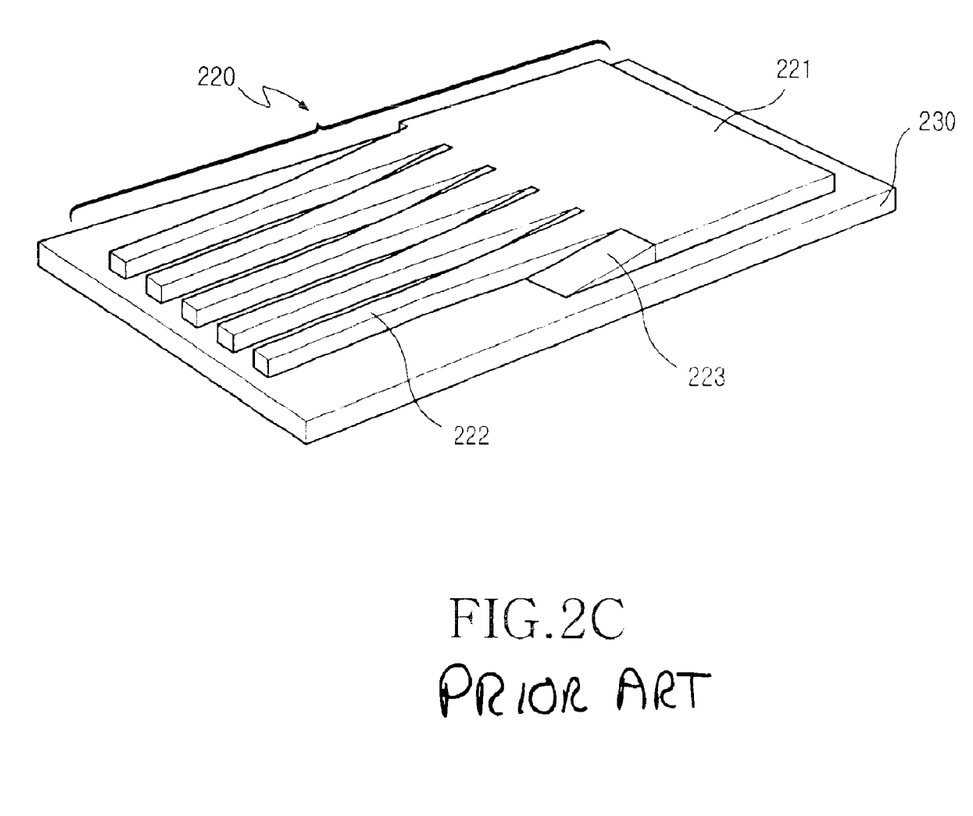
FIG. 2(c) is a perspective view of the vertical taper structure that is fabricated using a known shadow mask.

FIG. 2a through FIG. 2c are perspective views representing each step of the fabrication process of the conventional planar light waveguide circuit with a vertical taper structure. Referring to FIG. 2a through FIG. 2c, a planar light waveguide circuit 220 includes an arrayed waveguide 222, a slab 221, and a branch for connecting the slab 221 and the arrayed waveguide 222. The branch has a vertical taper structure 223 that is formed using a shadow mask 250. That is, the branch connecting the slab 221 and the arrayed waveguide 222 in the planar light waveguide circuit 220 includes a vertical taper structure 223 with a decreasing tilt in a fan-shape along the longitudinal direction of the arrayed waveguide 222.

As FIGS. 2a through 2c manifest, the method for fabricating a planar light waveguide circuit 220 with the vertical taper structure 223 using a shadow mask 250 involves layering a hard layer 210, forming a mask pattern 211, 212 on the hard layer 210, installing a shadow mask 250, and dry-etching the core layer 220.

Referring to FIG. 2a, the mask pattern is formed by layering the hard layer 210 on the core layer 220, and then forming a mask pattern to be shaped on the hard layer 210. Usually, a metallic or inorganic thin film is used for the hard layer 211. Underneath the core layer 220 is a clad layer 230.

Figure 2D:
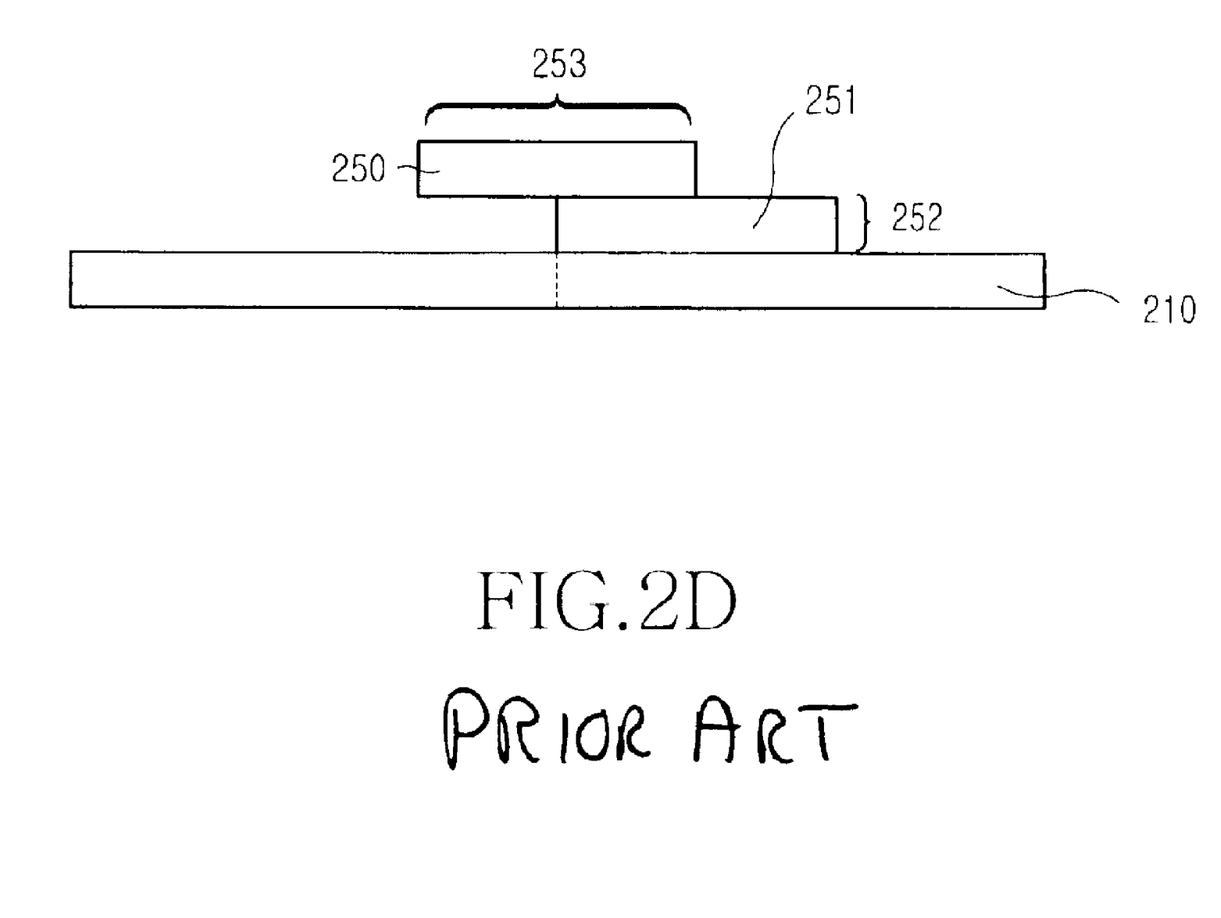
FIG. 2(d) is a side view of the planar light waveguide circuit with the shadow mask of FIG. 2(b)

Referring to FIGS. 2b and 2d, the shadow mask is installed by first placing a shadow mask 250 with a designated height 252 at the branch between the slab 221 and the arrayed waveguide 222 of the planer light waveguide circuit, and then installing the shadow mask 250 on the upper portion of the dummy mask 251. This procedure determines the tilt (or slope) of the vertical taper structure 223. That is, the tilt, length, or shape of the vertical taper is adjusted by adjusting the height 252 of the dummy mask 251 and the size 253 of the shadow mask 250.

Nevertheless, problems remain in the vertical taper structure using the shadow mask in that it is not that easy to adjust the gap between the shadow mask and the planar light waveguide and to array the dummy mask precisely on the branch. As a result, reproducibility of the products is degraded, and, naturally, they are not appropriate for mass production. In addition, as shown in FIG. 2c, in the step of dry-etching the vertical taper structure 223 is adjusted by modulating the height 252 and the size 253 of the shadow mask 250, and its etching rate. A gas (mainly, ion plasma) is used for the dry-etching step to process fine patterns. The preferred gas for the dry-etching includes $SF_6$, $CF_4$, $BCl_3$, $Cl_2$, $SiCl_2$ and so forth. As such, it is not easy to adjust shape (e.g., tilt and length) of the vertical taper structure.

SUMMARY OF THE INVENTION

The present invention relates to a method for fabricating planar light waveguide circuits with a vertical taper structure which prevents optical-signal loss due to the mode mismatch at a branch section connecting the optical circuit and the arrayed waveguide.

According to one aspect of the invention, there is provided the method for fabricating planar light waveguide circuits, wherein the circuit includes a structure that includes a substrate comprised of a core and under-clad layers, an optical circuit, and a plurality of arrayed waveguides being coupled thereon, the method including the steps of: layering a hard layer on the core layer for forming a mask pattern of the planar light waveguide circuit; forming the mask pattern on the hard layer; layering a photoresist layer on the branch of the optical circuit and the arrayed waveguides of the mask pattern; forming a vertical taper structure on the photoresist layer by using a gray scale mask; and, etching the core layer using the photoresist layer with the vertical taper structure and the mask pattern.

BRIEF DESCRIPTION OF THE DRAWINGS

The above features and advantages of the present invention will become more apparent from the following detailed description when taken in conjunction with the accompanying drawings in which:

FIG. 4(*a*) is a perspective view of forming a photoresist mask pattern on a hard layer for fabricating a vertical taper structure in accordance with the present invention;

FIG. 4(*b*) is a perspective view of forming a hard mask layer for fabricating the vertical taper structure in accordance with the present invention;

FIG. 4(*c*) is a perspective view of forming a mask pattern on the hard mask layer for fabricating the vertical taper structure in accordance with the present invention;

FIG. 4(*d*) is a perspective view of layering the photoresist layer on the branch of the arrayed waveguide and the optical circuit for fabricating the vertical taper structure in accordance with the present invention;

FIG. 4(*e*) is a perspective view of fabricating a taper structure on the photoresist layer using the gray scale mask for fabricating the vertical taper structure in accordance with the present invention;

FIG. 4(*f*) is a perspective view of a shape of the planer light waveguide circuit with a vertical taper structure in accordance with the present invention;

FIG. 5(*a*) is a side view of exposing ultraviolet light to the photoresist layer using the gray scale mask for fabricating the vertical taper structure in accordance with the present invention; and, FIG. 5(*b*) is a side view of the photoresist layer with the vertical taper structure with assistance of the gray scale in accordance with the present invention.

DETAILED DESCRIPTION OF THE PREFERRED EMBODIMENT

A preferred embodiment of the present invention will be described herein below with reference to the accompanying drawings. For the purposes of clarity and simplicity, well-known functions or constructions are not described in detail as they would obscure the invention in unnecessary detail.

In general, the planar light waveguide circuit is fabricated by layering a core layer and an under-clad layer on a substrate made of silicon or glass material, then etching a plurality of arrayed waveguides and optical circuits. For example, the arrayed waveguides and slab are coupled to make the planar-optical circuit, or the optical-power splitter and the Y-Branch that is included in the planar-optical circuit. This multi-branching structure often causes mode mismatch, loss in optical-signal power, and cross-talk with optical signals of other channels. A shadow mask has been used in order to overcome these problems, but it is very difficult to make a junction of the shadow mask on the planar-light waveguide, and to adjust the length, tilt, or shape of the vertical taper. Therefore, the present invention is mainly directed to minimize light loss owing to the mode mismatch between the slab and the arrayed waveguide, to fabricate a planar light waveguide circuit with a vertical taper structure more easily, and to ease the adjustment of tilt, length or shape of the vertical taper.

Figure 3:
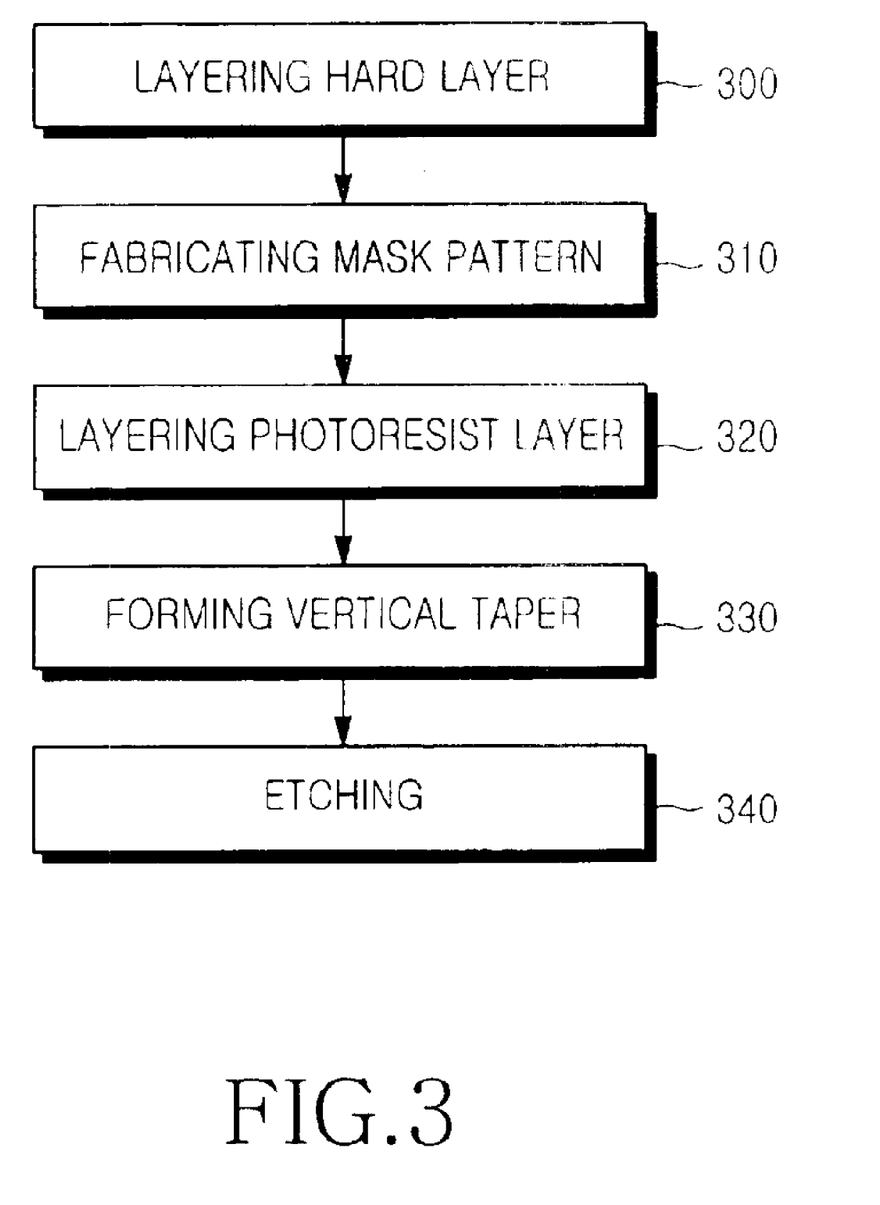
FIG. 3 is a flow chart explaining a method for fabricating a planar light waveguide with a vertical taper structure using a gray scale mask in accordance with the present invention.

Briefly, as depicted in FIG. 3, the method for fabricating a planar light waveguide circuit with a vertical taper structure using a gray scale mask 500 according to the embodiment of the present invention includes the steps of: layering a hard layer (S300); forming a mask pattern on the hard layer (S310); layering a photoresist layer (S320); forming vertical taper by using a gray scale mask (S330); and etching the core layer (S340).

The step of layering a hard layer (S300) involves depositing a hard layer 420 on the core layer of the substrate, thus allowing the hard layer to play an etch mask role during the subsequent etching step. As for the hard layer, a metallic or inorganic thin film can be used.

Figure 4A:
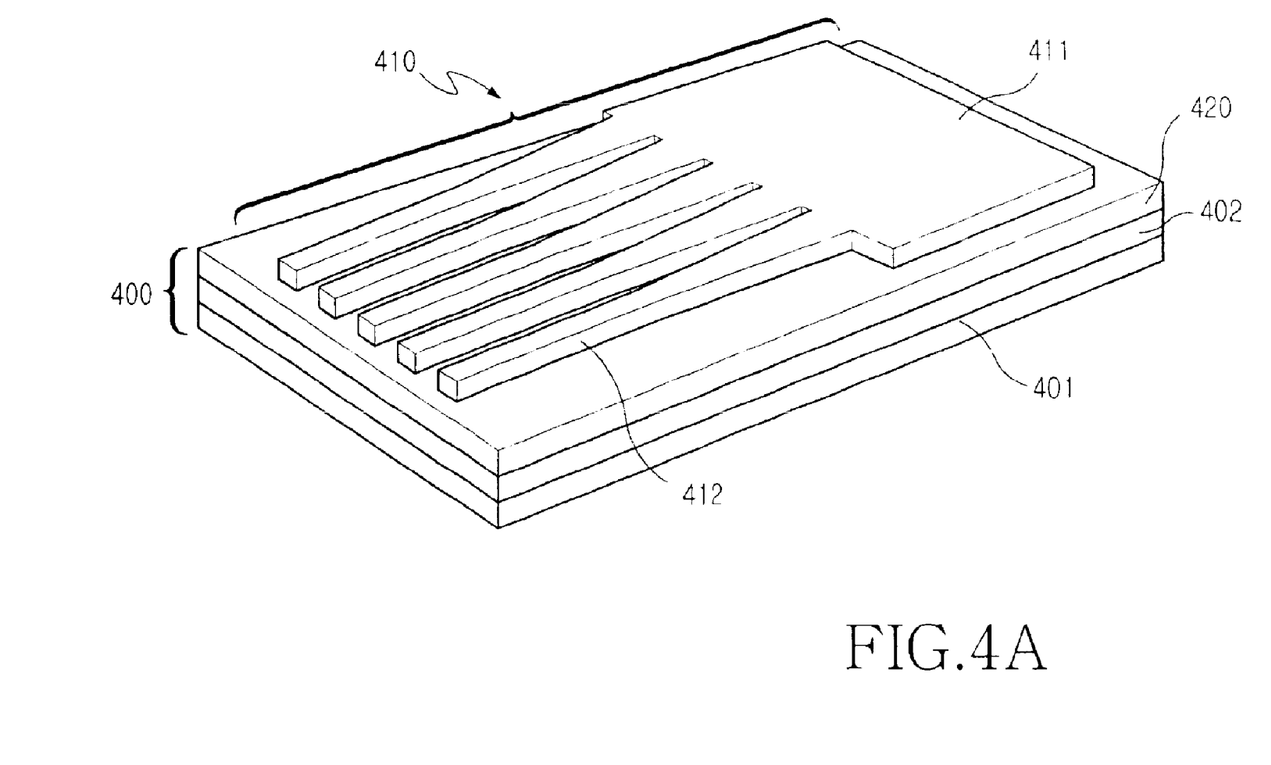
Figure 4B:
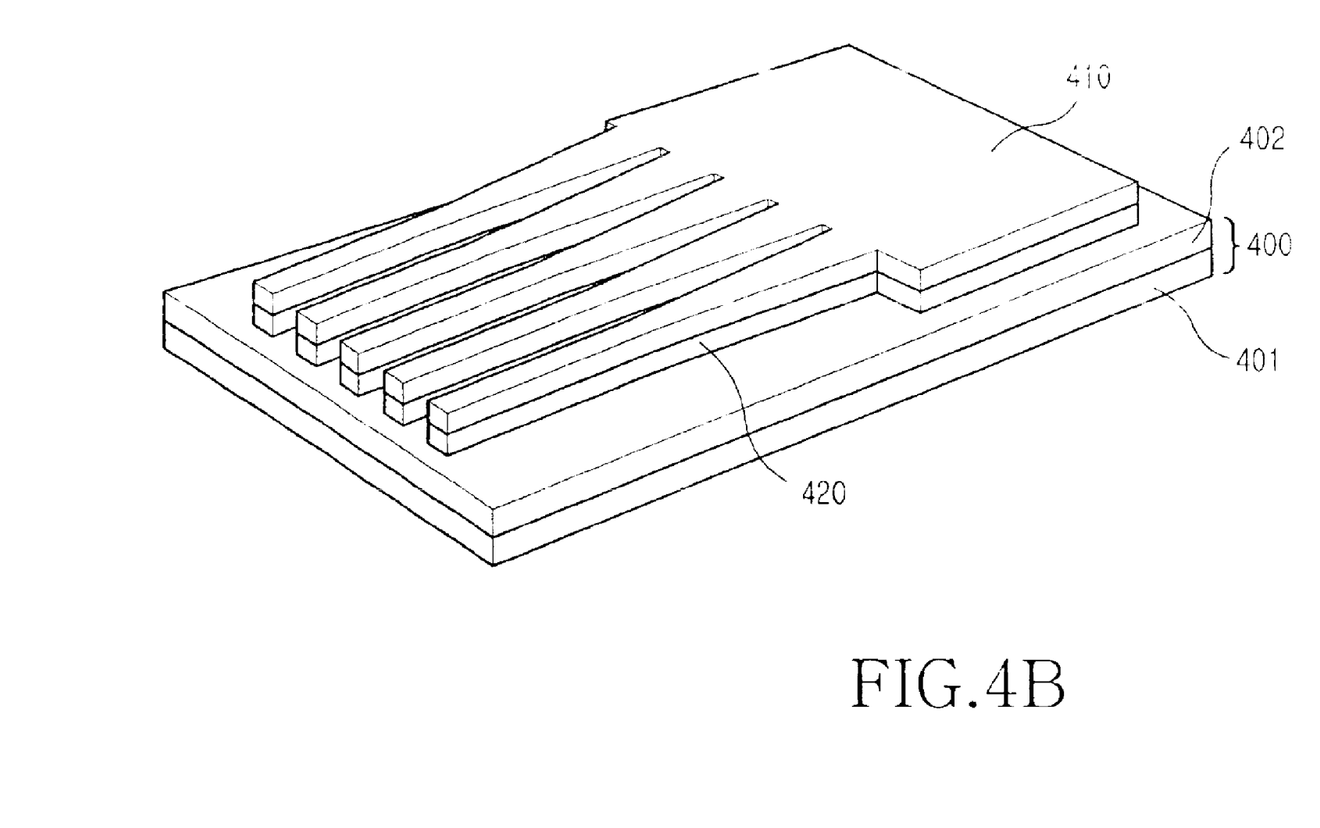
Figure 4C:
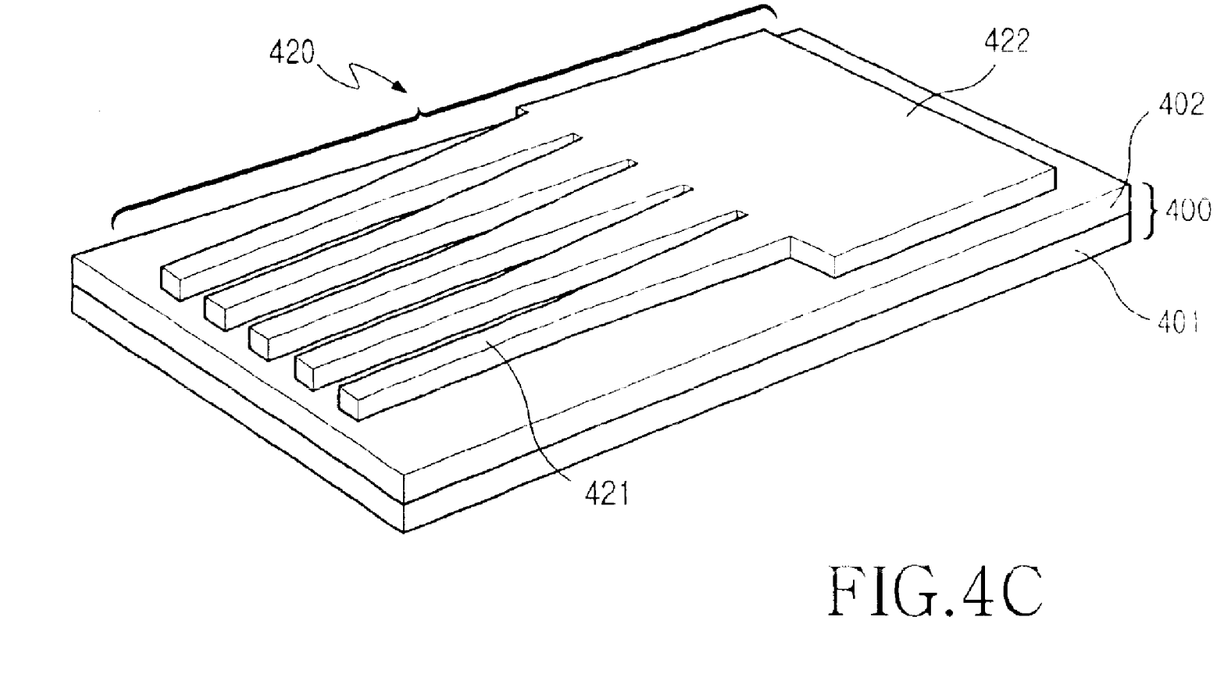

Referring to FIGS. 4*a* through 4*c*, the step of layering a hard layer (S300) involves depositing a hard layer 420 on the core layer 402 of the substrate 401, thus allowing the hard layer 420 to play an etch mask role during the subsequent etching step. As for the hard layer 420, a metallic or inorganic thin film can be used.

The mask pattern is formed (S310) by layering a photoresist layer 410 on the upper surface of the hard layer 420 and forming an optical-circuit pattern, including an arrayed waveguide 412 and an optical circuit 411 on the photoresist layer 410 through a lithography process (exposing and developing). The photoresist layer 410 on which the optical pattern is formed undergoes the etching process, thereby forming an optical-circuit pattern on the hard layer 420. Later, a strip process is carried out to remove any remaining photoresist layer. In this manner, the mask pattern is formed successfully on the hard layer 420.

Figure 4D:
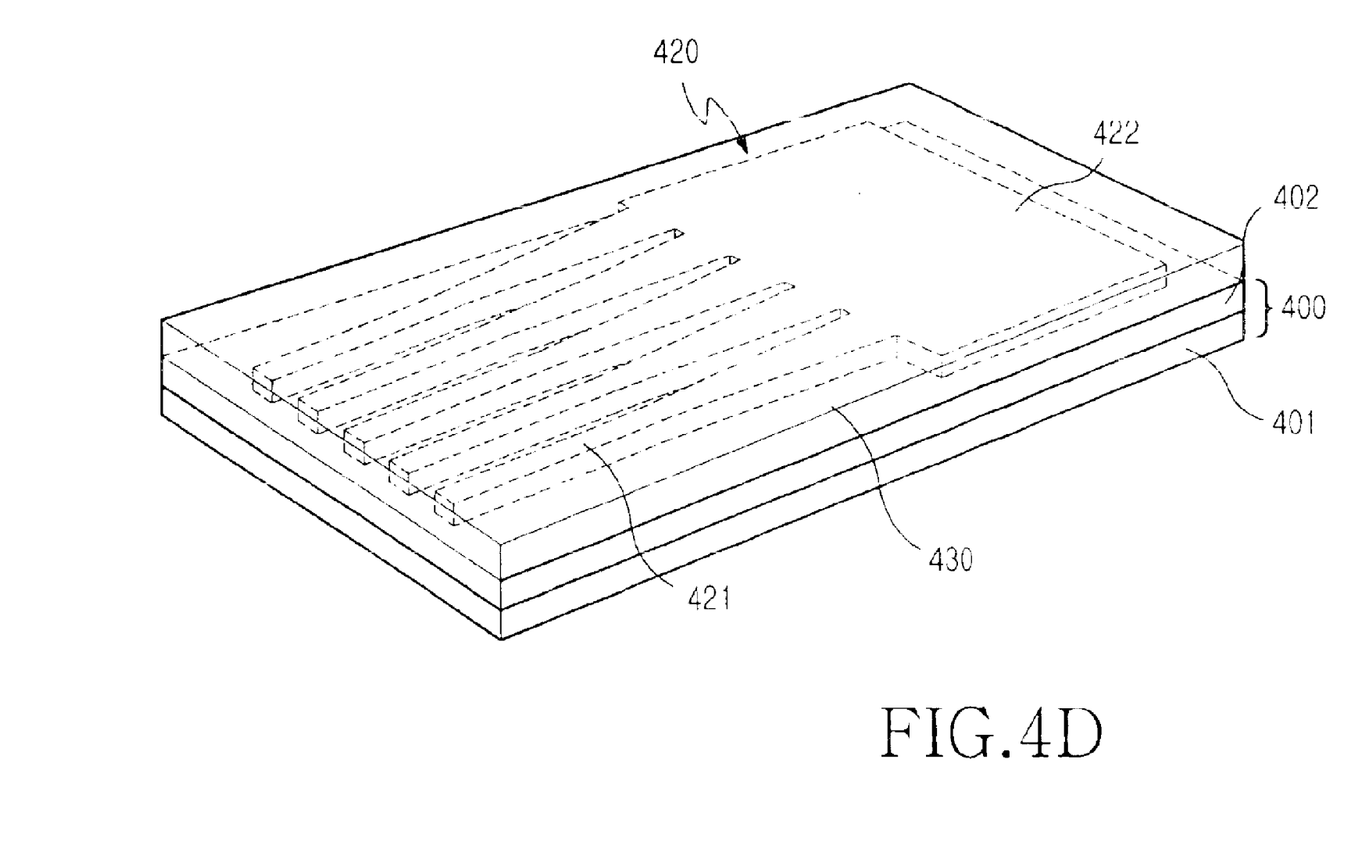

In the meantime, FIG. 4*d* shows the layering of a photoresist layer 430 on the mask pattern of the hard layer 420 (S330). The photoresist layer 430 is needed to embody the vertical taper structure at the branch section between the optical circuit 422 and the arrayed waveguide 421. Note that the thickness of the photoresist layer 430 is determined in consideration of the length and the tilt of the vertical taper and the etch rate of the core 402.

Figure 4E:
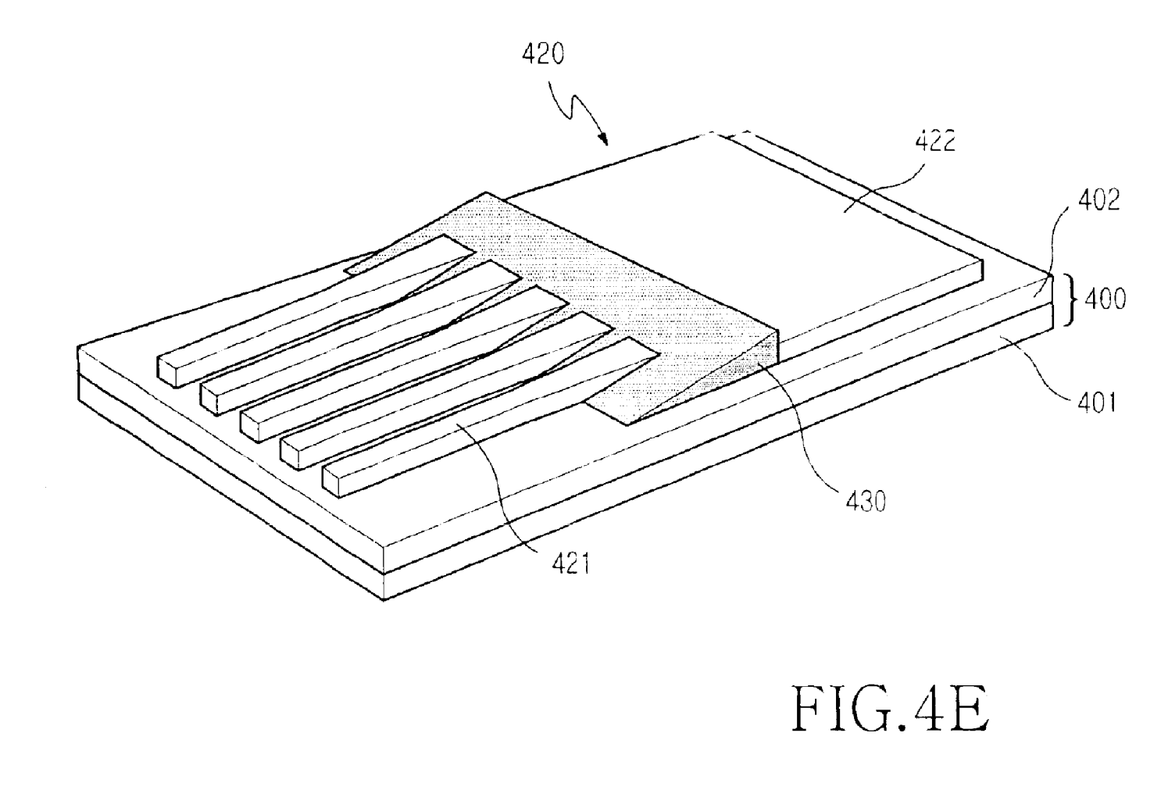
Figure 5A:
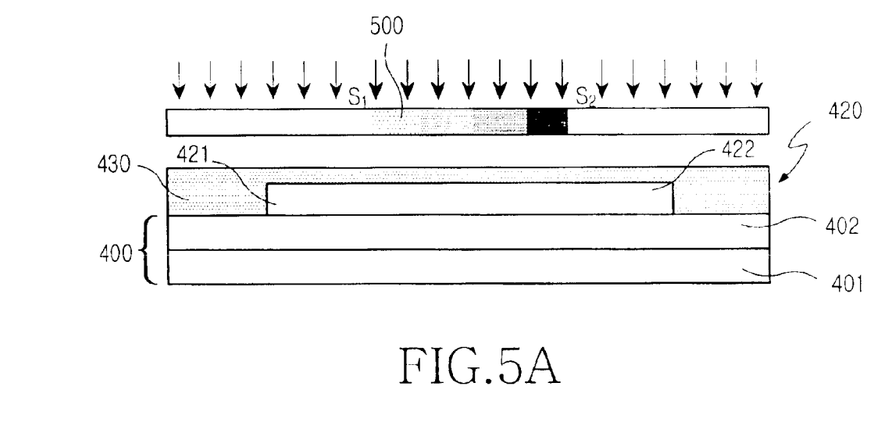
Figure 5B:
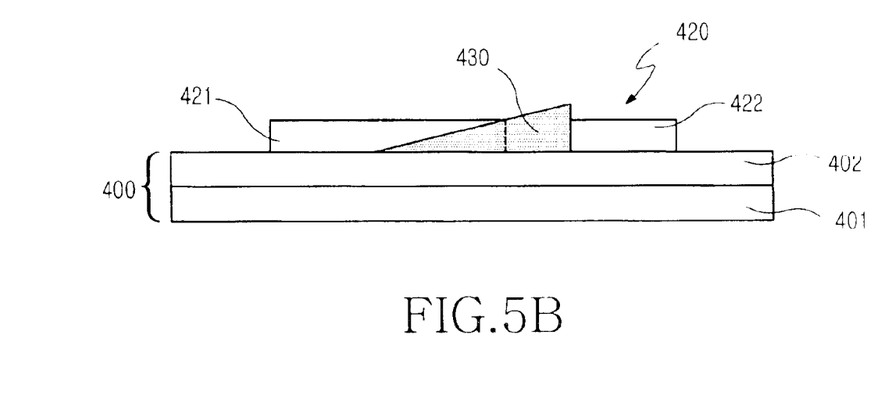

Referring to FIG. 4*e* and FIGS. 5*a* through 5*b*, the vertical taper is formed (S330) by layering the photoresist layer (S320) and exposing the photoresist layer 430 using the gray scale mask 500. The gray scale mask 500 gradually increases or decreases the ultraviolet transmittance in order to obtain a photoresist profile in a desired form. That is, the depth of the photoresist layer 430, which is usually removed by light exposure, changes depending on the ultraviolet transmittance of the gray scale mask 500, thus making it possible to obtain the tilted profiles. As shown in FIG. 5*a*, the gray scale mask 500 is positioned on the upper portion of the photoresist layer 430 to reduce ultraviolet transmittance as it goes from S1 to S2. In addition, one can easily adjust the tilt or the shape of the vertical taper structure by selectively modulating the light transmittance of the gray scale mask 500.

Figure 4F:
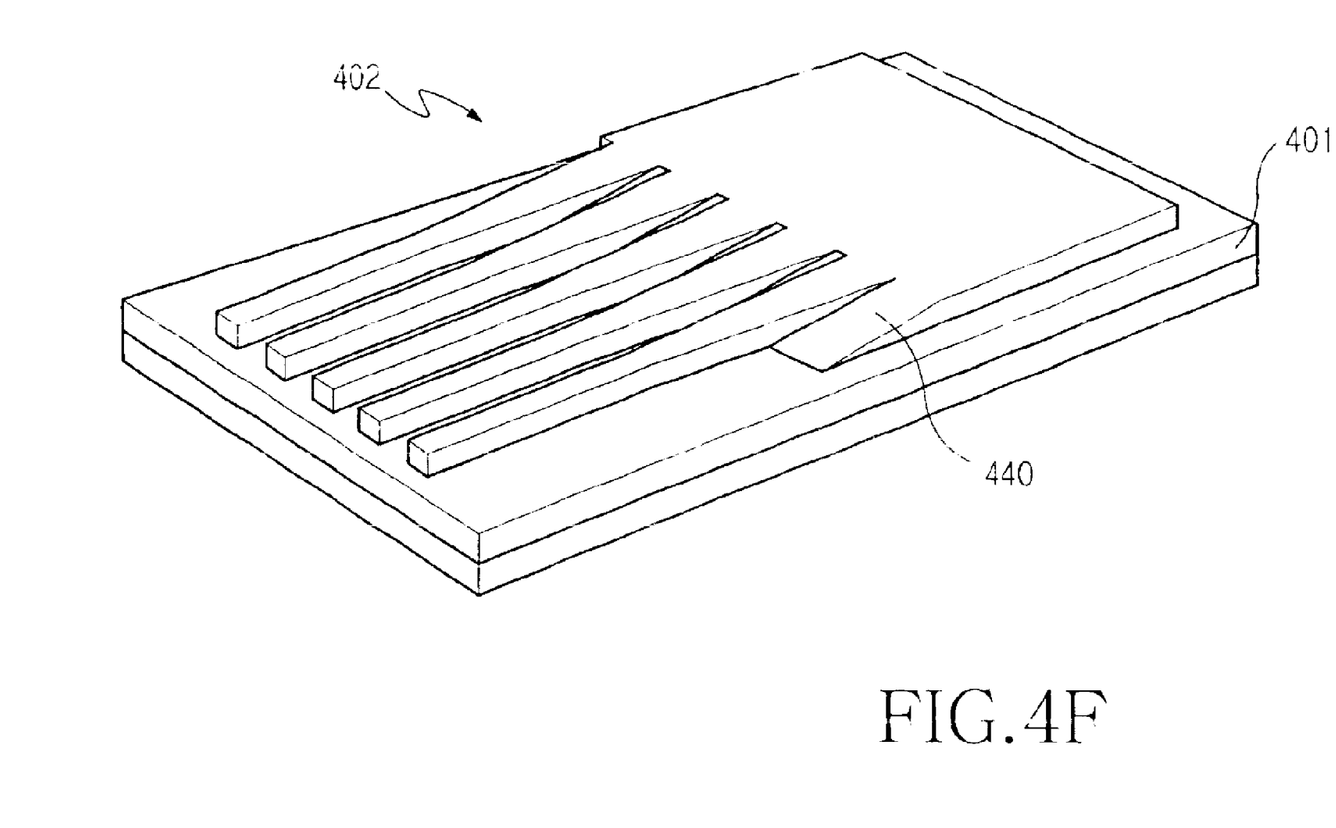

Referring to FIGS. 4*e* and 4*f*, the etching step (S340) involves dry etching the core 402 where the hard layer 420 with the optical-circuit pattern and the photoresist layer 430 with the vertical taper structure are layered. Here, where the photoresist layer 430 with the vertical taper structure is layered, the vertical taper structure is formed. In short, the optical-circuit pattern forming on the hard layer 420 forms the same optical-circuit pattern on the core 402, while the photoresist layer 430 with the vertical taper structure forms the vertical taper structure on the optical circuit-pattern branch of the core 402.

Lastly, any remaining hard layer and photoresist layer are stripped away, and then an over-clad layer is layered on the planer light waveguide circuit.

In conclusion, the method for fabricating a planar light waveguide circuit with the vertical taper structure using the gray scale mask according to the teachings of the present invention is advantageously effective for preventing loss in optical signals that is often caused by the mode mismatch between the optical circuit and the arrayed waveguide, and easing the fabrication of the vertical taper structure. Also, the present invention facilitates modulating the length and tilt of the vertical taper simply by adjusting the light-transmittance change of the gray scale mask.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for fabricating planar light waveguide circuits, wherein the circuit includes a substrate comprised of core and under-clad layers, an optical circuit, and a plurality of arrayed waveguides coupled thereon, the method comprising the steps of:

layering a hard layer on the core layer for forming a mask pattern of the planar light waveguide circuit thereon;

forming the mask pattern on the hard layer;

layering a photoresist layer on a branch section of the optical circuit and the arrayed waveguides of the mask pattern; and, forming a vertical taper structure on the photoresist layer using a gray scale mask.

2. The method defined in claim 1, further comprising the step of:

etching the core layer using the photoresist layer having the vertical taper structure and the mask pattern.

3. The method defined in claim 1, wherein a tilt of the vertical taper structure is modulated by selectively adjusting the etching of the photoresist layer and the core layer.

4. The method defined in claim 1, wherein a tilt of the vertical taper structure is modulated by adjusting a light transmittance through the gray scale mask.

5. The method defined in claim 1, wherein the step of forming the mask pattern on the hard layer comprises the steps of:

applying a layer having a shape of the mask pattern on the upper surface of the hard layer; and etching the layer having the shape of the mask pattern to form the optical-circuit pattern on the hard layer.

6. The method defined in claim 1, further comprising the step of removing any remaining photoresist layer that is not part of the mask pattern after forming the vertical taper structure on the photoresist layer.

* * * * *